Nov. 30, 1965   C. R. HALBACH   3,220,254
TWO-PHASE FLUID FLOWMETER
Filed Aug. 30, 1963
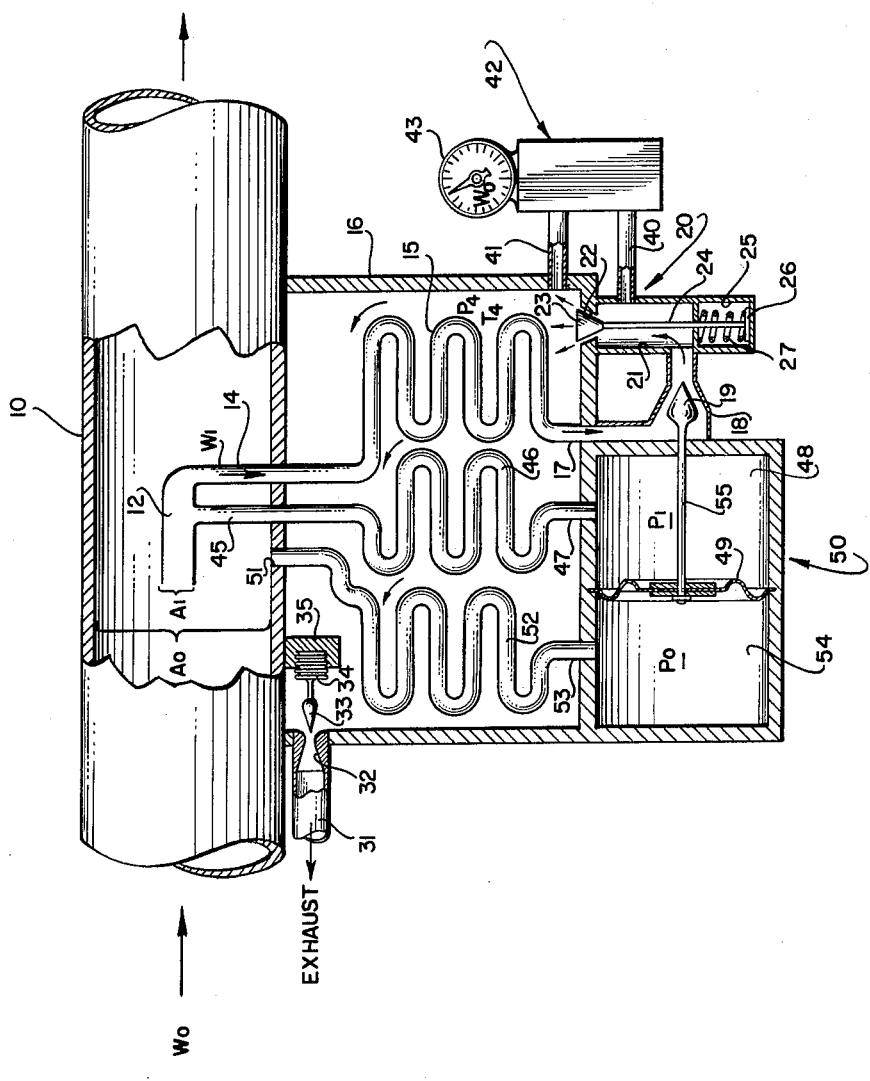
INVENTOR.
CARL R. HALBACH
BY R.E. Giauque
Attorney 3,220,254
TWO-PHASE FLUID FLOWMETER
Carl R. Halbach, Canoga Park, Calif., assignor to The Marquardt Corporation, Van Nuys, Calif., a corporation of California
Filed Aug. 30, 1963, Ser. No. 305,732
7 Claims. (Cl. 73—203)

This invention relates to a two-phase fluid flowmeter, and more particularly to a flowmeter for measuring the mass flow of a fluid existing in two states—namely, mixed liquid and vapor.

There are many device for measuring the mass flow of a pure liquid or the flow of a pure vapor or gas. Also, an attempt has been made to measure the mass flow of a two-phase fluid stream from a cryogenic fluid storage tank. For this purpose, a plurality of closely spaced temperature sensors are placed in a vertical line on the inside tank well and the slight temperature difference as detected by the sensors across the liquid-vapor interface indicates the height or level of the liquid in the tank. The temperature changes between sensors related to time provide only an average flow rate of no great accuracy. While conventional orifices and venturi meters can measure instantaneous flow rates in a single phase fluid, local flow acceleration of a cryogenic liquid through such flow measuring devices often produces sufficient reduction in static pressure of the liquid to cause boiling which results in two-phase flow.

The present invention utilizes a sampling probe in a passage through which a two-phase fluid to be measured is flowing. The flow rate through the probe is maintained at a fixed fraction of the main stream flow rate and the mass flow rate of the probe sample is measured to provide a measure of main stream flow rate. In order to measure the probe stream flow rate, the two-phase fluid is first reduced to a single liquid phase by utilizing the probe sample of cryogenic substance to provide refrigeration for converting the fluid to the single liquid phase. Since the total pressure at the probe inlet is always the same as in the main stream at the probe, equal mass flows in the probe and main stream can be obtained by maintaining the static pressure at the probe inlet equal to the static pressure in the main stream at the probe.

A change in state of the fluid before flow measurement is utilized in U.S. application Serial No. 278,730, assigned to the same assignee, wherein a liquid flow rate is determined by removing a proportional sample and vaporizing the sample before measuring its flow rate as a compressible fluid. In such a device, it is necessary to provide an external source of heat which adds complexity to the device. In the present invention, the metered sample is expanded in order to utilize its cooling capacity to condense all the vapor in the probe sample to a liquid. Thus, no external source of energy (either cooling or heating) is required in the operation of the invention.

It is therefore an object of the subject invention to provide a flowmeter for measuring the mass flow of a two-phase fluid stream.

Another object of the invention is to provide a flowmeter for measuring the mass flow rate of a two-phase fluid stream by converting a flow sample to a single liquid phase.

Another object of the invention is to provide a two-phase fluid flowmeter in which the two-phase fluid provides refrigeration for converting a flow sample to the single liquid phase.

These and other objects of the invention not specifically set forth above will become readily apparent from the accompanying description and diagrammatc illustrations of the invention.

Referring to the drawing, the main duct 10 contains a main stream of fluid existing in a two-phase condition, in which mixed liquid and vapor exist simultaneously. For instance, duct 10 can be connected with a supply of liquefied gas, such as oxygen or hydrogen, and because of the low temperatures of such cryogenic liquids in comparison to that of the surrounding conditions, heat leakage through the walls of supply container or through the duct can cause some of the liquid to vaporize, which results in a two-phase fluid being present in duct 10.

A total pressure probe 12 is located within duct 10 to capture a small sample of the main stream. The probe sample flows in passage 14 to heat exchanger condensing tube 15 located within insulated chamber 16. The two-phase sampled stream is cooled by cold vapor surrounding tubes 15 to cause all vapor from passage 14 to be condensed, such that only liquid exists in the outlet passage 17 for the condensing tube 15. Passage 17 introduces the liquid to an enlarged passage section 18 which coacts with a valve 19 to control the flow rate through probe 12. The liquid at static pressure $P_2$ then flows through a liquid meter 20 which comprises a passage 21 terminating in an orifice 22 leading into chamber 16. The area of the orifice is controlled by a valve 23 carried by a stem 24 extending through passage 21 into chamber 25. An end plate 26 on stem 24 receives the force of spring 27 which is in a direction to close orifice 22.

The chamber 16 has an outlet passage 31 containing an orifice 32 which is controlled by a pressure regulator consisting of a valve 33 positioned by a pressure sensitive bellows 34 mounted on a stationary support 35 within the chamber 16. Thus, the liquid in passage 17 is introduced at pressure $P_2$ to liquid meter 20 and expands through orifice 22 to a lower pressure $P_4$ in chamber 16 and the vapor leaves chamber 16 through passage 31. The valve 33 controls the discharge flow of the vapor in order to maintain the pressure $P_4$ at a constant value, and the temperature $T_4$ of the expanded fluid entering chamber 16 is the liquid saturation temperature corresponding to constant pressure $P_4$. Since the mass flow rate of liquid through meter 20 is a function of pressure $P_2$ and $P_4$ on each side of orifice 22, these pressures are fed through passages 40 and 41, respectively, to differential pressure transducer 42 and converted to an output signal of mass flow rate at flow indicator 43. Since the pressure $P_4$ is constant, the flow rate varies with only the pressure $P_2$. Liquid meter 20 is of the type which will provide a linear relationship between the mass flow and signal pressure $P_2$. Any liquid metering technique can be used in place of meter 20. The flow indicator 43 can be matched to the functional dependence between mass flow and signal pressure $P_2$ for the meter which is used.

The liquid in chamber 16 boils as it absorbs heat through the chamber walls, and as it condenses the vapor in the two-phase fluid sample within condensing tube 15. A static pressure passage 45 is attached to probe 12 and leads to heat exchanger condensing tube 46 wherein all the vapor in the two-phase fluid entering passage 45 is condensed by the cold fluid in chamber 16. The liquid leaving tube 46 is connected through conduit 47 with chamber 48 located on one side of the diaphragm 49 of actuator 50. Also, a static pressure tap 51 is located in the wall of duct 10 and connects with condensing tube 52 wherein all the entering vapor is condensed, and the liquid leaving tube 52 is connected through conduit 53 with chamber 54 of actuator 50. The diaphragm 49 is connected with valve 19 by stem 55 and the valve is therefore positioned to maintain the static pressure $P_1$ in probe 12 equal to the static pressure $P_0$ at tap 51, which is at the same location induct 10 as the open end of probe 12. Actuator 50 can be replaced by any appropriate actuator technique such as an electric torque motor-driven valve with pressures $P_0$ and $P_1$ transduced to electric signals to drive the torque motor.

The primary function of the flowmeter device is to have probe 12 extract a flow $W_1$ which is a constant proportional part of the main stream flow $W_0$ and this is accomplished by matching the probe inlet conditions to the main stream fluid conditions. The mass flow rate $W_1$ of the sampled fluid is constantly maintained proportional to the probe-to-duct area ratio $A_1/A_0$, by static balance of pressures $P_0$ and $P_1$, and by flow control restrictor 20 which maintains $P_1$ equal to $P_0$. By having the probe inlet size larger than the average vapor bubble size by an order to magnitude, a representative sample of the main stream flow is obtained. The mass flow $W_{0L}$ of the liquid phase in duct 10 is determined by the continuity of mass equation as $$W_{0L} = \rho_0 v_0 A_{0L}$$

and the mass flow $W_{1L}$ of the liquid phase in probe 12 is $$W_{1L} = \rho_1 v_1 A_{1L}$$

where $\rho$ is density, $v$ is velocity, $A_{0L}$ and $A_{1L}$ are liquid flow areas of the duct and probe, respectively, and the subscripts 0 and 1 refer, respectively, to the duct 10 and probe 12.

Since the liquid portion is incompressible, its density is the same in the duct and in the probe and thus $\rho_0 = \rho_1$. Also, since flow frictional effects are considered negligible between the essentially coincident stations in the duct and in the probe, the pressures are equal and thus $P_{T0} = P_{T1}$. In addition, the static pressure $P_0$ is maintained equal to static pressure $P_1$, i.e. $P_0 = P_1$. For the liquid, Bernoulli's equation for the duct 10 and probe 12 are $$P_{T0} - P_0 = \tfrac{1}{2}\rho_0 v_0^2$$

and $$P_{T1} - P_1 = \tfrac{1}{2}\rho_1 v_1^2$$

It therefore follows that since $$P_{t0} - P_0 = P_{T1} - P_1 \text{ and } \rho_0 = \rho_1$$

then $$v_0 = v_1 \text{ and } \rho_0 v_0 A_{0L} = \rho_1 v_1 A_{1L}$$

From the above, it is apparent that the proportionality factor K between liquid mass flow rates in the probe 12 and duct 10 is $$K = \frac{A_{1L}}{A_{0L}} = \frac{W_{1L}}{W_{0L}}$$

For the vapor, the proportionality between the mass flow rates $W_{0V}$ and $W_{1V}$ in the duct 10 and probe 12, respectively, can be shown by the following general compressible flow equations expressed in terms of total conditions.

$$W_{0V} = \frac{P_{T0} A_{0V} (P/P_t m) 0V}{\sqrt{T_{t0}}}$$

and $$W_{1V} = \frac{P_{T1} A_{1V} (P/P_t m) 1V}{\sqrt{T_{t1}}}$$

where $(P/P_t m)$ is the generalized mass flow function, $T_t$ is total temperature, $A_{0V}$ and $A_{1V}$ are vapor flow areas of the duct and probe, respectively, and the subscripts 0 and 1 refer to the duct and probe, respectively.

The total pressures and temperatures in the sampling probe inlet and in the main stream are equal since the probe is located within duct 10. This assumes the probe inlet process is adiabatic in the case of the total temperature equality, and isentropic in the case of the total pressure equality. Also, because of the pressure balance control of valve 19, the static pressures $P_0$ and $P_1$ are equal. Since both the static pressures and total pressures in the probe inlet and the main stream are equal, it follows that the static-to-total pressure ratio in the probe is equal to that in the main stream. Therefore, the Mach number of the vapor in the probe inlet is equal to the Mach number of the vapor in the main stream, and the mass flow function $(P/P_t m)$ of the probe and main stream are equal. By dividing the two equations immediately above and cancelling the equal values, it is seen that the vapor mass flow through the sampling probe is a constant proportion of the vapor mass flow through duct 10

$$K = \frac{A_{1V}}{A_{0V}} \frac{W_{1V}}{W_{0V}}$$

Since a constant proportionality is maintained by the probe in the liquid phase and the vapor phase, it then follows that the proportionality also holds for the liquid-vapor mixture. Thus $$\frac{W_1}{W_0} = \frac{W_{1L} + W_{1V}}{W_{0L} + W_{0V}} = \frac{KW_{0L} + KW_{0V}}{W_{0L} + W_{0V}} = K$$

The proportionality constant K is also equal to the ratio of total flow areas of the probe and the duct $$\frac{A_1}{A_0} = \frac{A_{1L} + A_{1V}}{A_{0L} + A_{0V}} = \frac{KA_{0L} + KA_{0V}}{A_{0L} + A_{0V}} = K$$

Thus, K is determined by the ratio of the internal diameters of the probe 12 and the duct 10. Since the two-phase fluid flow through the probe 12 is a constant fraction K of the duct flow, it is apparent that the flow indicator 43 can be calibrated to read directly the mass flow of the fluid through the duct 10.

Homogeneous flow should be present in duct 10 to obtain proper sampling by probe 12 and such condition usually exists at some point in the flow of cryogenic fluids. Generally, the flow of a cryogenic two-phase fluid can be (a) homogeneous flow with liquid containing bubbles of vapor, (b) annular flow with vapor in a central core and liquid on the duct wall, or (c) slug flow with alternate regions of liquid and vapor. Where annular or slug flow occurs, mechanical mixers ahead of the sampling station can usually be used to homogenize the stream. In some cases where it is not feasible to correct the non-homogeneous flow, sufficient flow metering accuracy may be obtained by the use of several sampling probes arranged across the pipe in a manner which will provide a total sample representative of the average total fluid flow. Various other modifications of the invention are contemplated by those skilled in the art without departing from the spirit and scope of the invention as hereinafter defined by the appended claims.

What is claimed is:

1. A flowmeter for measuring the mass flow rate of a two-phase cryogenic fluid flowing in a duct comprising:

a probe located in said duct for receiving a sample of the two-phase fluid flowing in said duct;

means for condensing the vapor phase of said two-phase sample to convert said sample to a single-phase liquid;

means for maintaining the static pressure in said probe equal to the static pressure in said duct opposite the probe by regulating the flow through said probe; and means for measuring the flow of said probe sample in its single liquid phase for obtaining a measure of mass flow rate proportional to the mass flow rate in said duct said maintaining means comprising a first static pressure passage connected to said duct and a second static pressure passage connected to said probe, liquefying means connected with each of said passages for separately liquefying the vapor phase received from each of said passages, and differential pressure regulator means connected to said liquefying means and responsive to the pressure of the liquids discharged from said liquefying means for regulating the flow through said probe.

2. A flowmeter for measuring the mass flow rate of a two-phase cryogenic fluid flowing in a duct comprising:

a probe located in said duct for receiving a sample of the two-phase fluid flowing in said duct;

means for condensing the vapor phase of said two-phase sample to convert said sample to a single-phase liquid;

means for maintaining the static pressure in said probe equal to the static pressure in said duct opposite the probe by regulating the flow through said probe; and means for measuring the flow of said probe sample in its single liquid phase for obtaining a measure of mass flow rate proportional to the mass flow rate in said duct;

said condensing means comprising a condensing chamber receiving the sampled fluid discharged from said measuring means, and condensing tube means in said chamber receiving said two-phase probe sample for liquefying the vapor phase of said sample upstream of said measuring means by utilizing said discharged sampled fluid as the coolant.

3. A flowmeter as defined in claim 2 wherein said measuring means comprises an orifice through which said single phase of said sample is passed to obtain a pressure differential proportional to probe mass flow.

4. A flowmeter as defined in claim 2 wherein said static pressure maintaining means comprises:

a first static pressure passage connecting with the entrance of said probe and a second static pressure passage connecting with said duct at a location opposite the entrance to said probe;

first and second separate condensing tubes in said chamber connecting with said first and second passages, respectively, for condensing the vapor phase in said passages;

a pressure differential regulator receiving the liquid discharged from said first and second condensing tubes; and valve means controlled by said regulator for controlling the flow through said probe in accordance with the difference in pressure of the liquids discharged from said condensing tubes.

5. A flowmeter as defined in claim 3 having an outlet for exhausting the sampled fluid from said condensing chamber, and regulating means controlling said outlet for maintaining the pressure constant in said chamber and for maintaining the temperature of the sampled fluid after expansion through said orifice at the liquid saturation temperature corresponding to said constant temperature.

6. A flowmeter for measuring the mass flow rate of a two-phase fluid flowing in a duct comprising:

a probe located in said duct for receiving a sample of the two-phase fluid flowing in said duct;

means for maintaining the mass flow of said probe sample proportional to the mass flow through said probe;

means for measuring the mass flow through said probe; and condensing means utilizing the sampled fluid discharged from said measuring means as the coolant for converting said probe sample to a single-phase liquid upstream of said measuring means.

7. A flowmeter as defined in claim 6 wherein said proportional flow maintaining means comprises regulator means for maintaining the static pressure in said probe equal to the static pressure in said duct opposite said probe, said regulator means including a valve for controlling the flow of the single liquid phase upstream of said measuring means.

References Cited by the Examiner
UNITED STATES PATENTS

| | | | |
|---|---|---|---|
| 1,611,008 | 12/1926 | Earl | 73—203 |
| 2,780,938 | 2/1957 | Chamberlin | 73—202 |

LOUIS R. PRINCE, *Primary Examiner.*

RICHARD QUEISSER, *Examiner.*